Feb. 7, 1956
O. H. SCHUCK
2,734,155
MOTOR CONTROL APPARATUS ADAPTED FOR
AUTOMATIC TO MANUAL CHANGE-OVER
Filed May 29, 1953
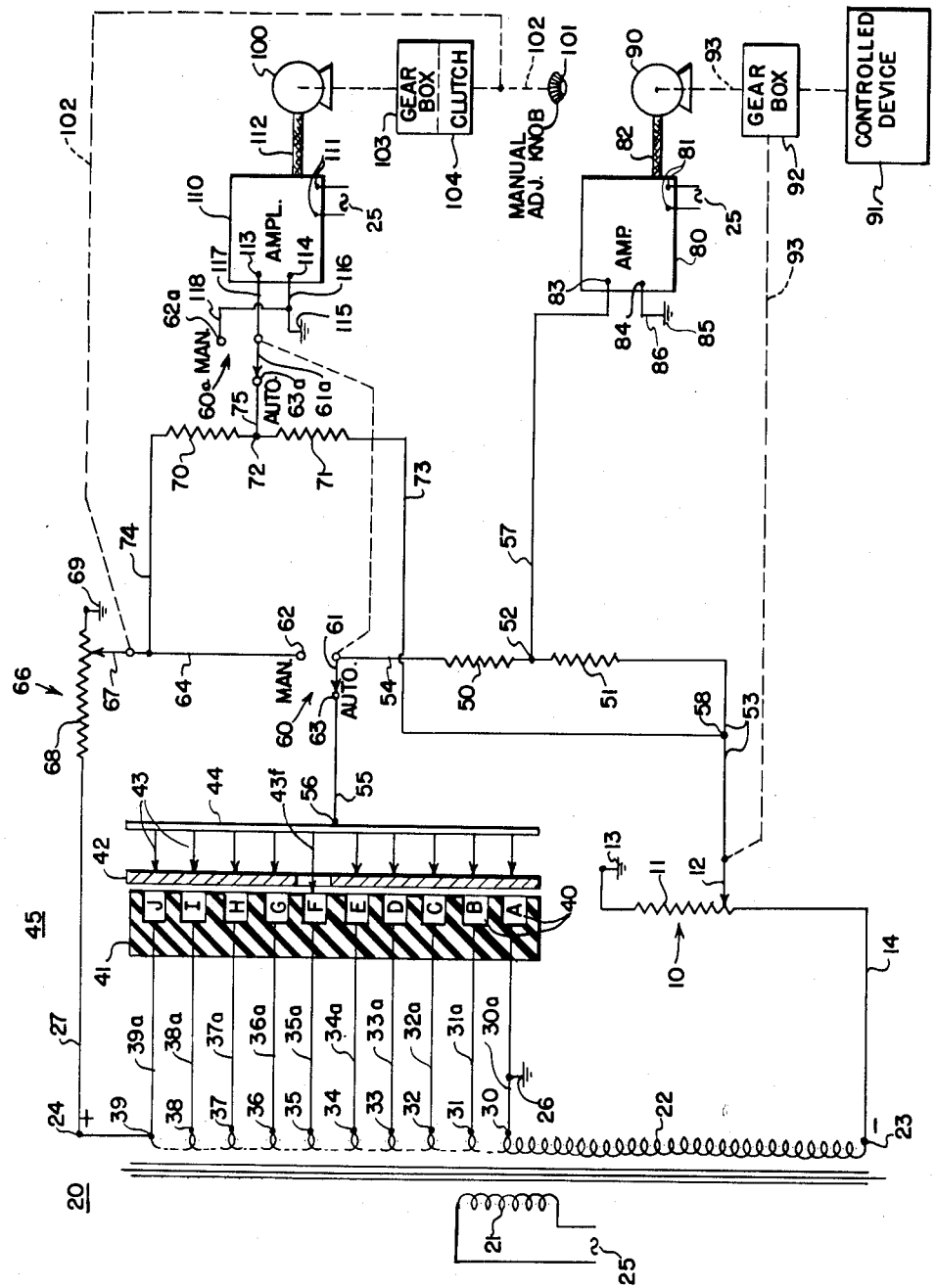
INVENTOR.
OSCAR HUGO SCHUCK
BY George H. Fisher
ATTORNEY

United States Patent Office 2,734,155
Patented Feb. 7, 1956

2,734,155

MOTOR CONTROL APPARATUS ADAPTED FOR AUTOMATIC TO MANUAL CHANGE-OVER

Oscar Hugo Schuck, Minneapolis, Minn., assignor to Minneapolis-Honeywell Regulator Company, Minneapolis, Minn., a corporation of Delaware Application May 29, 1953, Serial No. 358,293

13 Claims. (Cl. 318—19)

This invention relates to the field of motor control systems. In the control arts it is frequently desirable to control the operation of an electric motor in accordance with a variable condition, which in this case is shown as a variable magnitude electrical signal. This variable signal may be controlled either by automatic means or by manual means. Normally the signal, and thereby the system, is controlled by the automatic means, but it is sometimes desirable to substitute therefore the manual control. In the systems used previously no method was provided for equalizing the manual control with the automatic control; thus when the system was transferred from automatic to manual control there often resulted a sudden change in signal level which was very undesirable. At this point this invention deviates from the prior art. This invention provides a control system with means normally equalizing the manual signal means with the automatic means.

An object of the invention therefore is to provide a control system in which a controlled device may be caused to operate in accordance with either a manually adjusted signal or an automatically adjusted signal without the possibility of a transient signal surge when control is transferred from automatic to manual.

A more specific object of the invention is to provide a control apparatus in which a controlled device may be caused to operate in accordance with either a manually adjusted signal or an automatically adjusted signal and wherein a servo system normally maintains the manually adjusted signal equalized with the automatically adjusted signal when the manual is not being used to control thus eliminating the possibility of a signal surge when control is transferred from automatic to manual.

Various other objects, advantages, and features of novelty which characterize the invention are pointed out with particularity in the claims annexed hereto and forming a part hereof. However for a better understanding of the invention, its advantages, and objects attained by its use, reference should be had to the subjoined drawing, which forms a further part hereof, and to the accompanying descriptive matter, in which there is illustrated and described a preferred embodiment of the invention.

The single figure of the drawing is a diagrammatic representation of control apparatus showing an embodiment of the present invention. Briefly, the figure as a whole includes a transformer 20 energizing an automatic selector 45, a manually adjusted signal selector 66, and a balance signal selector 10. Normally the automatic selector energizes an amplifier 80 which controls the operation of a reversible motor 90 to drive balance selector 10 and a device to be adjusted 91. Switching means provide a selection of automatic or manual control to amplifier 80. A second reversible motor 100 which is controlled by a second amplifier 110 maintains the signal from the manual control equalized with the signal from the automatic selector 45 when the latter is in control. Selector 45 indirectly energizes the amplifier 110.

Now in more detail the figure shows the balance signal selector 10 as a voltage divider comprising a resistance winding 11 and a movable contact 12 which may be displaced therealong while remaining in electrical contact therewith. The upper terminal of winding 11 is connected to ground 13. The winding 11 of the voltage divider is energized from the lower half of secondary winding 22 of the transformer 20 whose primary winding 21 is energized from a suitable source 25 of alternating voltage of a selected frequency. The secondary winding 22 has a pair of terminals 23 and 24 and a plurality of taps 30 through 39 inclusive which have equal increments of voltage developed between the taps. The following table shows the potential developed on each tap with respect to center tap 30 which is grounded at point 26.

| Tap: | Units of voltage |
|---|---|
| 30 | 0 |
| 31 | 1 |
| 32 | 2 |
| 33 | 3 |
| 34 | 4 |
| 35 | 5 |
| 36 | 6 |
| 37 | 7 |
| 38 | 8 |
| 39 | 9 |
| 23 | —9 (opposite phase) |

A card 42 which is used to control the motor 90 through the automatic selector system 45 is a conventional commercial record card provided with eighty columns of ten spaces each, numbered from 0 to 9. In use one space of each column is perforated, and the location of the perforations represent one of the ten Arabic numerals. As many columns are used as there are digits in the largest number to be handled by the card. The selector 45 as shown in the diagram has been simplified for explanatory purposes and only the units selector has been shown. In use however the selector could also include a tens and a hundreds selector to allow a large selection of possible values. Such a system is shown in my copending application, Serial No. 170,971, filed June 19, 1950, now Patent No. 2,715,703, August 16, 1955, and assigned to the assignee of the present application.

Selector 45 is arranged to cooperate with the first column of the card 42. Thus selector 45 is shown to comprise ten fixed contacts 40 which have suffix letters A, B, C, D, E, F, G, H, I, J, which are molded or otherwise supported by an insulated member 41 in such relative position as to be aligned with the positions of all possible perforations in the first column of card 42.

Spaced from and parallel to the insulating member 41 is a contact bar 44 carrying ten resilient contact fingers 43, each of which is aligned with one of the fixed contacts 40 so that when any of the positions in column one of card 42 is perforated, the finger and the fixed contact associated with that position make electrical connection. Fixed contact 40A is connected to tap 30 by conductor 30a. Similarly fixed contacts 40B, 40C, 40D, 40E, 40F, 40G, 40H, 40I, 40J, are connected to taps 31, 32, 33, 34, 35, 36, 37, 38, and 39 respectively by conductors 31a, 32a, 33a, 34a, 35a, 36a, 37a, 38a, and 39a. Contact finger 43F is shown as engaging fixed contact 40F, so that a voltage of five units appears between contact bar 44 and grounded center tap 30. This voltage is applied to the amplifier 80 by means of a circuit including two summing resistors 50 and 51 and a switch 60 which comprises two contacts 62 and 63 and a switch arm 61. Contact 63 of switch 60 is connected to contact bar 44 at junction 56 by a conductor 55. Switch arm 61 is connected to the summing resistor 50 by a conductor 54 and summing resistor 51 is connected to slider 12 of voltage divider 10 by a conductor 53. The junction 52 of the two resistors 50 and 51 is connected to the amplifier 80 at terminal 83 by a conductor 57.

Phase sensitive amplifier 80 may be of the type shown in Gille Patent No. 2,425,734 and is shown to comprise a power connection 81 connected to the same source of A. C. power 25 as the transformer 20, an output cable 82, and a pair of input terminals 83 and 84. Terminal 84 is grounded at point 85 by conductor 86. When the system is at balanced condition the voltage at junction 52 of the summing resistors is zero and since no signal is being applied to amplifier 80 the reversible motor 90 is not energized and remains stationary. When the voltage at the input 83 of the amplifier is not zero the motor 90 is energized by amplifier 80 through control cable 82 which causes operation of the motor 90 in one direction or the other, depending on whether the signal voltage at junction 52 is of one phase or the opposite phase. Operation of the motor adjusts the position of the slider 12, until the voltage appearing at the input to the amplifier 80 is reduced to zero, at the same time that it is adjusting the controlled device 91. The motor 90 is connected to slider 12 and controlled device 91 by a mechanical connection 93 which may include a gear reduction box 92 if necessary.

The manually adjusted signal source 66 is shown as a voltage divider comprising a resistance winding 68 and a movable contact or slider 67. One terminal of the voltage divider 66 is grounded at point 69. The ungrounded terminal is connected to transformer terminal 24 by a conductor 27, and the voltage divider 66 is energized by the upper half of secondary winding 22 and hence its output is of the same phase as that of selector 45. The potential impressed on slider 67 is connected to contact 62 of switch 60 by a conductor 64 and is also connected to the amplifier 110 by a circuit including two summing resistors 70 and 71 and a switch 60a comprising two contacts 62a and 63a and a switch arm 61a movable unitarily with arm 61 of switch 60. A junction 72 of resistors 70 and 71 is connected to an input terminal 113 of amplifier 110 by a conductor 75, switch 60a and conductor 117. Summing resistor 71 is connected to slider 12 of voltage divider 10 by conductors 73 and 53. The reversible motor 100 drives the slider 67 and a manual adjustment knob 101 by means of a mechanical connection 102 which may include suitable reduction gearing 103 and a suitable clutch 104.

Phase sensitive amplifier 110 is shown comprising a power connection 111 which is connected to a suitable source of A. C. power 25 which is the same as that applied to the transformer 20, an output cable 112, and a pair of input terminals 113 and 114. Terminal 114 is grounded at point 115 by a conductor 116. As was stated before, terminal 113 is connected to the junction 72 of summing resistors 70 and 71 when the switch is in the "automatic" position. If the voltage at junction 72 is not zero the amplifier 110 energizes the motor 100 to run in one direction or the other, depending on the phase of the signal voltage at junction 72. Motor 100 adjusts slider 67 until the voltage appearing at junction 72 has been reduced to zero, thus reducing the input signal to the amplifier to zero which balances the system and stops the motor.

It will be appreciated that switches 60 and 60a move simultaneously as the two switch arms 61 and 61a are mounted on the same shaft. When the switch is moved to the "manual" position the signal from the summing resistors 70 and 71 to the amplifier input 113 is disconnected and input terminal 113 is grounded through conductor 117, switch 60a, and conductor 118 thus disabling amplifier 110 and motor 100. A second effect of switching to manual position is that the switch arm 61 in moving from contact 63 to contact 62 disconnects the automatic selector from summing resistor 50 and substitutes the manual signal source 66, thus allowing manual control of the signal to amplifier 80.

A friction clutch 104 is shown connected in the mechanical linkage 102 between the motor 100 and slider 67. This device allows the manual adjusting of slider 67 by knob 101 without rotating motor 100.

*Operation*

Transformer 20 is energized from A. C. supply source 25 and energizes the selector system 45, and voltage dividers 10 and 66 from its secondary winding 22.

It being desired to adjust the controlled device 91 to a series of different positions, a series of cards similar to card 42 are prepared, each card bearing in its first column perforations representing one of the positions to which the controlled device is to be adjusted. These cards are passed in sequence between the member 41 and the contact bar 44 and each card causes the appearance of a voltage on the contact bar 44 in accordance with the numerical value of the number in question. In the case shown in the drawing a current path can be traced from the tap 35 of winding 22 through conductor 35a, contact 40F, contact finger 43F, contact bar 44, conductor 55, switch 60, conductor 54, resistors 50 and 51, conductor 53 to slider 12, resistance winding 11 and conductor 14 to the terminal 23 of the transformer winding. The voltage from the contact bar 44 is applied from the junction 52 of the summing resistors 50 and 51 and thus to the amplifier 80. Amplifier 80 energizes the motor 90 to adjust the controlled device 91 and simultaneously adjust the slider 12 along winding 11 and until the input voltage applied to the amplifier 80 is reduced to zero. This operation takes place anew each time a card is replaced. The apparatus thus provides a series of steps of positioned control as called for by the perforations in successive cards.

Provisions have been made for manually adjusting the potential applied to the summing resistors 50 and 51 and thus to the amplifier 80. To accomplish this the switch 60 is moved from the "automatic" position as shown on the diagram to the "manual" control position, which disconnects the automatic selector 45 from the amplifier 80 and connects the voltage divider 66 to the summing resistor 50 and thus to amplifier 80.

It is desirable to be able to switch from automatic adjustment to manual adjustment without changing the adjustment of said controlled device because of the switching. With equipment as described so far, there would be difficulty encountered in the switching process since means were not provided to keep the manual adjustment knob setting synchronized with the automatic signal level. In that case, when the switch 60 was moved from automatic to manual a sudden change in signal could be applied to the amplifier 80 and thus cause a sudden movement of the controlled device 91. This has been the case with prior art equipment, and has been found undesirable. In order to maintain the setting of the voltage divider 66 synchronized with the signal from the automatic selector and thus provide smooth changeover, amplifier 110 and motor 100 are utilized. A current path can be traced from the terminal 24 of secondary winding 22, through conductor 27, the part of resistance winding 68 to the left of slider 67, slider 67, conductor 74, summing resistors 70 and 71, conductors 73 and 53 to slider 12, lower part of winding 11, and conductor 14 back to the lower terminal 23 of secondary winding 22. The junction 72 between summing resistors 70 and 71 is connected to input terminal 113 of amplifier 110 by conductor 75, switch 60a and conductor 117. When the slider 12 of voltage divider 10 is being adjusted by the operation of motor 90, the adjustment process is rebalancing amplifier 80, but since the potential applied to summing resistor 71 is being changed simultaneously by the movement of slider 12 it causes an unbalance signal at the input of amplifier 110. The amplifier 110 then energizes motor 100 causing it to run in one direction or the other depending on the phase of the potential at junction 72. Motor 100 drives manual adjustment knob 101 and slider 67 of voltage divider 66 until the potential at the input to the amplifier 110 has been reduced to zero.

Another way of showing the action of the circuit would be to consider that as is shown in the diagram a potential of 5 units is applied to the contact bar 44 because of the location of the perforation in card 42. Assuming resistors 50 and 51 are equal in value, it is necessary that slider 12 be at a potential of minus 5 units on voltage divider 10 in order for junction 52 to be at zero potential so that the amplifier input is balanced and the motor 90 is not energized. Thus motor 90 thus drives slider 12 to a point of equal potential with the automatic selector but of opposite polarity. Now the second summing network comes into play. As slider 12 is being adjusted to a potential of minus 5 units under control of amplifier 80 it is causing a potential to appear at junction 72. In order for a zero potential to appear at junction 72, slider 67 must be at a point of potential equal in magnitude to the potential at slider 12 but of opposite polarity. Thus amplifier 110 will energize motor 100 to drive slider 67 to the proper potential so that a zero signal appears at the input to the amplifier 110, balancing the system. It will now be appreciated that since the positive 5 units of potential at the contact bar 44 causes slider 12 to be moved to a negative 5 units and that the negative 5 units of potential at the slider 12 causes the slider 67 to be moved to a potential of a positive 5 units, the slider 67 is being maintained at the same potential as appears on contact bar 44. Therefore when the switch 60 is turned from automatic to manual, amplifier 80 senses no change in signal. Assuming an instantaneous polarity of potential on the transformer winding as is shown such that terminal 24 is positive and 23 negative, the path of current flow through this new circuit is from terminal 24 of the secondary winding, through conductor 27, part of winding 68, slider 67, conductor 64, switch contact 62, switch arm 61, conductor 54, resistors 50 and 51, conductor 53, slider 12, part of winding 11, conductor 14 and to the lower terminal 23 of the transformer winding. Now, the signal to amplifier 80 can be adjusted manually by rotating the manual adjustment knob 101 which moves the slider 67 along the voltage divider 66. This produces a changing signal to the amplifier 80 the same as changing cards in the automatic selector.

When the signal to amplifier 80 is being controlled manually by slider 67 it is necessary to disable amplifier 110 and motor 100 and this is done by contacts on the switch 60a. When the switch is in manual position terminal 113 is connected to ground through conductor 117, switch arm 61a, switch contact 62a and conductor 118, thus disabling the amplifier 110.

Although a digital controller type of automatic signal means has been illustrated in the diagram and discussed, this invention is not limited to use with any particular type of automatic signal means and may easily be adapted to various systems by those skilled in the art.

In general while I have shown certain specific embodiments of my invention, it is to be understood that this is for the purpose of illustration and that my invention is to be limited solely by the scope of the appended claims.

I claim as my invention:

1. Control apparatus comprising in combination: a device to be adjusted; first motor means connected to adjust said device; automatic signal means for controlling adjustment of said device; manually adjusted signal means for controlling adjustment of said device; second motor means energizable to adjust said manually adjusted means; means connected to said motor means and said automatic signal means for normally causing energization of both said motor means in accordance with the signal from said automatic signal means; and switching means connected to said signal means for disabling said second motor means and said automatic signal means and causing energization of said first motor means in accordance with the signal from said manually adjusted signal means.

2. In a control system, a device to be adjusted; first motor means connected to adjust said device; automatic signal means for controlling adjustment of said device; first and second further signal means; second motor means connected to adjust said second further signal means; circuit means connecting said signal means to said motor means for normally causing operation of said first motor means in accordance with the signals from said automatic signal means and said first further signal means, and causing operation of said second motor means in accordance with the signals from said further signal means; switching means connected to said signal means and operable to disable said second motor means and said automatic signal means, and to cause operation of said first motor means in accordance with the signals from said further signal means; and manual means connected to said second further signal means for adjusting the same independently of said second motor means, so that said device may be adjusted either manually or automatically and so that when said device is being adjusted automatically said second further signal means and said manual means are adjusted simultaneously therewith.

3. In a control system, a device to be adjusted; automatic signal means for controlling adjustment of said device; manual signal means for controlling adjustment of said device; a further signal means; a first motor means being connected to adjust said device and said further signal means; a second motor means being connected to adjust said manual signal means; means normally causing operation of said first motor means in accordance with the signals from said automatic signal means and said further signal means, and causing operation of said second motor means in accordance with the signals from said further signal means and said manual signal means; switching means operable to disable said second motor means and said automatic signal means, and to cause operation of said first motor means in accordance with the signals from said manual signal means and said further signal means; and means connected to said manual signal means for adjusting the same independently of said second motor means whereby said device may be adjusted either manually or automatically and whereby when said device is being adjusted automatically said further signal means and said manual means are adjusted simultaneously therewith.

4. In a control system, a device to be adjusted; first motor means connected to adjust said device; automatic signal means for controlling adjustment of said device; manually adjusted signal means for controlling adjustment of said device; second motor means connected to said manually adjusted means and energizable to adjust said manually adjusted signal means; amplifier means connected to said motor means and said signal means and normally causing energization of said motor means in accordance with the signal from said automatic signal means; and switching means connected to said signal means and said amplifier means for disabling said second motor means and said automatic signal means and causing energization of said first motor means in accordance with the signal from said manually adjusted signal means.

5. Control apparatus comprising in combination; a device to be adjusted; automatic and manual signal means for controlling adjustment of said device; further signal means connected to be adjusted simultaneously with adjustment of said device; first motor means connected to adjust said device in response to signals from said automatic signal means and said further signal means; second motor means connected to adjust said manual signal means in response to signals from said further signal means and said manual signal means; and switching means connected to said automatic manual signal means and said motor means for disabling said second motor means and said automatic signal means and causing energization of said first motor means in accordance with the signal from said manual signal means and said further signal means.

6. Control apparatus comprising in combination; automatic signal means; manual signal means; first motor means; further signal means connected to said motor means and adjusted by the operation of said motor means; circuit means connecting said automatic signal means and said further signal means to said motor means so that said motor means is energized to adjust said further signal means; second motor means having its output connected to said manual signal means for adjusting same upon energization of said second motor means; circuit means connecting said further signal means and said manual means to said second motor means for supplying a signal to energize said second motor means and thus adjust said manual signal means; and switching means connected to said signal means to disable said second motor means and said automatic signal means and causing energization of said first motor means in accordance with the signal from said manual signal means and said further signal means.

7. Control apparatus comprising in combination: automatically controlled signal means; manually controlled signal means; first amplifier means; first motor means connected to the output of said amplifier means; further signal means connected to said motor means and adjusted by the operation of said motor means; circuit means connecting said automatic signal means and said further signal means to said amplifier means; second motor means connected to adjust said manual signal means; second amplifier means connected to said second motor means to control its operation; circuit means connecting said further signal means and said manual signal means to said second amplifier means; and switching means connected to said signal means for disabling said second motor means and said automatic signal means and causing energization of said first motor means in accordance with the signal from said manual signal means and said further signal means.

8. Control apparatus comprising in combination: a device to be adjusted; automatic and manual signal means for controlling adjustment of said device; motor means connected to adjust said device in response to signals from said automobile signal means; a servo system connected to said signal means to equalize the signals from said manual signal means and said automatic signal means; and switching means connected to said signal means for disabling said servo system and said automatic signal means and causing energization of said motor means in accordance with the signal from said manual signal means.

9. Control apparatus comprising in combination; a device to be adjusted; automatic and manual signal means for controlling adjustment of said device; motor means connected to adjust said device; circuit means connecting said signal means to said motor means; a servo system connected to said signal means to equalize the signal magnitudes of said manual signal means and said automatic signal means; and switching means for disabling said servo system and said automatic signal means and causing energization of said motor means in accordance with the signal from said manual signal means.

10. Control apparatus comprising in combination: a device to be adjusted; first means connected to adjust said device; second means for controlling adjustment of said device; third means for controlling adjustment of said device; circuit means connecting said first and second means; motor means connected to said second means for adjusting said second means; and switching means in said circuit means for disconnecting said second means from said first means and simultaneously connecting said third means to said motor means for energizing said motor means so that said second means is equalized with said third means.

11. Control apparatus comprising in combination: a device to be adjusted, first means connected to adjust said device; first signal means for controlling adjustment of said device; second signal means for controlling adjustment of said device; circuit means connecting said first means and said first signal means; motor means connected to said first signal means for adjusting said first signal means; and switching means in said circuit means for disconnecting said first signal means from said first means and simultaneously connecting said second signal means to said motor means for energizing said motor means so that said first signal means is equalized with said second signal means.

12. Control apparatus comprising in combination; a device to be adjusted; first motor means connected to adjust said device; first signal means for controlling adjustment of said device; second signal means for controlling adjustment of said device; circuit means connecting said first motor means and said first signal means; second motor means connected to said first signal means for adjusting said first signal means; and switching means in said circuit means for disconnecting said first signal means from said first motor means and simultaneously connecting said second signal means to said second motor means for energizing said second motor means so that said first signal means is equalized with said second signal means.

13. Control apparatus comprising in combination: a device to be adjusted, first control signal means continuously producing a control signal and adapted to adjust said device, second control signal means continuously producing a control signal and adapted to adjust said device, means for transferring control of said device from one of said control signal means to the other control signal means, and means controlled by said first control signal means when said first control signal means is controlling said device for adjusting said second control signal means so that the signal outputs from said first and second control signal means are equalized when said first control means is controlling said device.

References Cited in the file of this patent

UNITED STATES PATENTS

| | | |
|---|---|---|
| 2,589,834 | MacCallum | Mar. 18, 1952 |
| 2,634,391 | Rusler | Apr. 7, 1953 |
| 2,656,497 | Schweighofer et al. | Oct. 20, 1953 |
| 2,667,608 | Siderman | Jan. 26, 1954 |